(12) United States Patent
Bookbinder et al.

(10) Patent No.: US 9,073,291 B2
(45) Date of Patent: Jul. 7, 2015

(54) POLYMER OVER MOLDING OF STRENGTHENED GLASS

(75) Inventors: Dana Craig Bookbinder, Corning, NY (US); Atanas Valentinov Gagov, Painted Post, NY (US); William Edward Lock, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1031 days.

(21) Appl. No.: 12/775,122

(22) Filed: May 6, 2010

(65) Prior Publication Data

US 2010/0285260 A1 Nov. 11, 2010

Related U.S. Application Data

(60) Provisional application No. 61/176,682, filed on May 8, 2009.

(51) Int. Cl.
 *B32B 3/06* (2006.01)
 *B32B 17/10* (2006.01)
 *B32B 3/02* (2006.01)
 *B29C 45/14* (2006.01)
 (Continued)

(52) U.S. Cl.
 CPC .............. *B32B 17/10* (2013.01); *Y10T 428/161* (2013.01); *B32B 3/02* (2013.01); *G06F 1/1656* (2013.01); *B29C 45/14434* (2013.01); *B29C 45/14311* (2013.01); *B29K 2709/08* (2013.01)

(58) Field of Classification Search
 CPC ...... B32B 3/02; G06F 1/1656; Y10T 428/161
 USPC ........................................................ 428/192
 See application file for complete search history.

(56) References Cited

U.S. PATENT DOCUMENTS 3,558,415 A * 1/1971 Chabal ........................ 428/215
5,773,148 A * 6/1998 Charrue et al. ............... 428/410
6,815,070 B1 11/2004 Burkle et al.
(Continued)

FOREIGN PATENT DOCUMENTS

JP 2003-031784 A 1/2003

OTHER PUBLICATIONS

V.F. Solinov et al; "Protective Coating for Edges of Glass Matrices"; Glass and Ceramics; vol. 52, Nos. 9-10, 1995 p. 267-269.
(Continued)

*Primary Examiner* — Mark Ruthkosky
*Assistant Examiner* — Christopher Polley
(74) *Attorney, Agent, or Firm* — Ryan T. Hardee

(57) ABSTRACT

Glass articles for use as covers in electronic devices and methods for forming the same are described herein. The glass articles generally include a shaped glass substrate comprising a first face, a second face and a perimeter edge. The shaped glass substrate may be formed from strengthened glass such that the shaped glass substrate has a compressive stress layer which improves the ability of the glass article to withstand surface damage without cracking. A polymer overmold is coupled to the attachment feature of the perimeter edge of the shaped glass substrate thereby protecting the perimeter edge of the shaped glass substrate from damage. In one embodiment, at least a portion of the perimeter edge of the shaped glass substrate comprises an attachment feature offset from the first face. In another embodiment the polymer overmold is integrally formed with at least one connector.

10 Claims, 8 Drawing Sheets

(51) Int. Cl.
*G06F 1/16* (2006.01)
*B29K 709/08* (2006.01)

(56) References Cited

U.S. PATENT DOCUMENTS

2002/0068678 A1* 6/2002 Seto et al. ............... 501/70
2003/0177734 A1* 9/2003 Reames et al. ........... 52/716.5
2004/0007022 A1 1/2004 Tominaga et al.
2006/0238355 A1 10/2006 Kokuryo et al.
2009/0197048 A1* 8/2009 Amin et al. .............. 428/142
2009/0241317 A1 10/2009 Kubler et al.

OTHER PUBLICATIONS

Mei Wen et al; "Edge-Strengthening of Flat Glass With Acrylate Coatings"; Journal of Non-Crystalline Solids; 354 (2008) 5060-5067.

* cited by examiner

POLYMER OVER MOLDING OF STRENGTHENED GLASS

CROSS REFERENCE TO RELATED APPLICATIONS

The present application claims priority to U.S. Provisional Patent Application Ser. No. 61/176,682 filed May 8, 2009 and entitled "Polymer Over-Molding Of Strengthened Glass," the entirety of which is incorporated herein by reference.

FIELD

The present specification generally relates to glass articles that are insert molded with polymeric materials and, more specifically, to strengthened thin glass substrates that are over-molded with polymeric materials and methods for making the same.

TECHNICAL BACKGROUND

Injection molding is commonly used to form various types of plastics articles. One of the attributes of the injection molding process is that it allows for the formation of complex geometries with precise dimensional control. Injection molding has been previously used in conjunction with metal parts in a process known as insert molding or over-molding. For example, electrical connectors which include a metal part integrated into a plastic housing may be formed by insert molding. One example of a complex-shaped injection molded part is the lens for an automotive headlamp. One of the advantages of such a part is the ease of design and manufacturing in that all of the mounting surfaces and attachment points can be readily incorporated in the polymer material by molding.

While the injection molding process allows for the formation of complex shapes and dimensional control, plastic parts themselves have qualities that are often undesirable. For example, plastic parts are soft and can easily be scratched relative to other materials such as glass, glass-ceramic and ceramic parts. Herein is described a method that enables one to combine the superior qualities of glass, glass-ceramic and ceramic materials along with the formability of polymeric materials to make complex and dimensionally controlled articles. Glass articles formed by the method are also described.

SUMMARY

According to one embodiment, a glass article for use as a cover for electronic devices includes a shaped glass substrate comprising a first face, a second face and a perimeter edge. The shaped glass substrate may be formed from unstrengthened glass or strengthened glass such as chemically tempered glass, thermally tempered glass, laminated glass or various combinations thereof. Where the shaped glass substrate is formed from strengthened glass, the shaped glass substrate includes a compressive stress layer having a depth of at least 15 microns with a compressive stress of at least 10 MPa. At least a portion of the perimeter edge of the shaped glass substrate comprises an attachment feature offset from the first face. A polymer overmold is coupled to the attachment feature of the perimeter edge of the shaped glass substrate.

In another embodiment, a glass article for use as a cover in electronic devices includes a shaped glass substrate comprising a first face, a second face and a perimeter edge. The shaped glass substrate may be formed from unstrengthened glass or strengthened glass such as chemically tempered glass, thermally tempered glass, laminated glass or various combinations thereof. Where the shaped glass substrate is formed from strengthened glass, the shaped glass substrate includes a compressive stress layer having a depth of at least 15 microns with a compressive stress of at least 10 MPa. A polymer overmold is coupled to at least a portion of the perimeter edge of the shaped glass substrate and is integrally formed with at least one connector.

In another embodiment a method for making a glass article comprising a polymer overmold includes forming a shaped glass substrate having a first face, a second face and a perimeter edge. The shaped glass substrate is positioned in a mold cavity formed in a first half of an injection mold such that a compliant layer is disposed between the shaped glass substrate and the first half of the injection mold. A second half of the injection mold is engaged with the first half of the injection mold. Polymeric material is injected into the injection mold to form the polymer overmold such that the polymer overmold is coupled to at least a portion of the perimeter edge of the shaped glass substrate.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
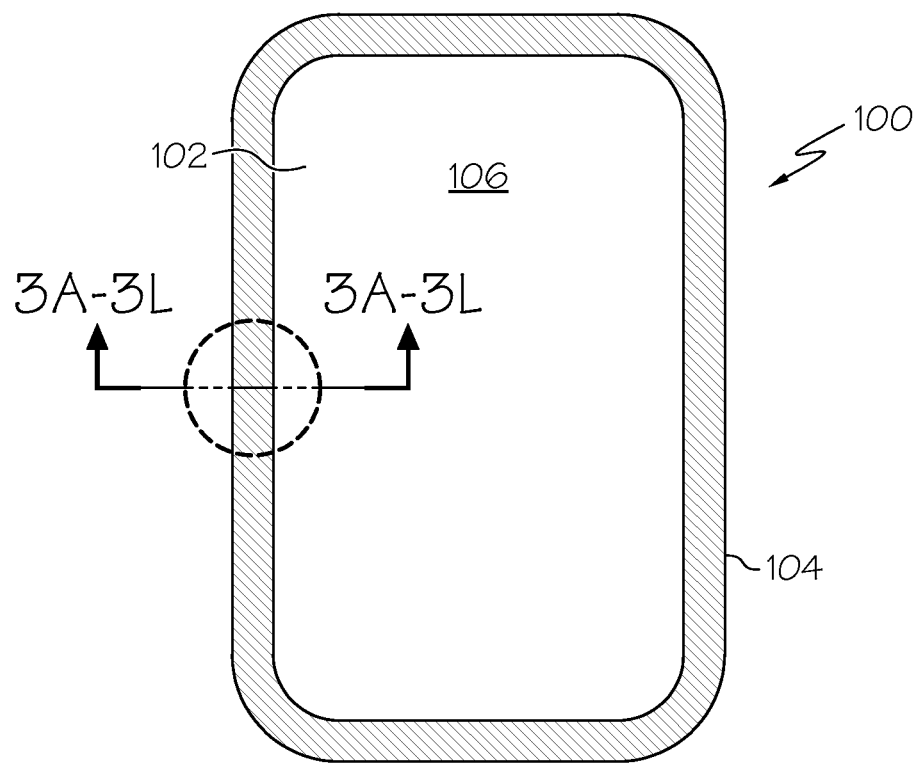
FIG. 1 schematically depicts a glass article comprising a shaped glass substrate and a polymer overmold according to one or more embodiments shown and described herein.

Reference will now be made in detail to various embodiments of glass articles with polymer overmolds, examples of which are illustrated in the accompanying drawings. Whenever possible, the same reference numerals will be used throughout the drawings to refer to the same or like parts. One embodiment of a glass article is schematically depicted in FIG. 1. The glass article generally comprises a shaped glass substrate and a polymer overmold. The shaped glass substrate comprises a first face, a second face and a perimeter edge. The polymer overmold is coupled to the perimeter edge of the shaped glass substrate by overmolding. Glass articles and methods for making the glass articles will be described in more detail herein with specific reference to the appended figures.

The term "glass," as used herein, means a glass, glass-ceramic or ceramic material, substrate or part, the ceramic part being made from a glass material by ceramming. The terms "substrate" and "part," as used herein, mean a "glass" substrate or part that is placed in a mold to be overmolded, entirely or in part, to form a "glass" article; and the term "article" means a substrate or part that has a polymer over all or part of the substrate or part. With reference to overmolding a substrate with a polymer material, when the substrate is referred to as being overmolded "entirely or in part," "in whole or in part," "all or in part" and similar phrases, the words "entirely," "all" and "in whole" mean that all surfaces (faces and edges) of the substrate are overmolded with the polymeric material and the phrase "in part" means that one or more selected surfaces and edges are overmolded with the polymeric material. By way of example and without limitation, "in part" may mean the edges only, one or both faces only, or the edges and a selected part of one or both faces.

Referring now to FIG. 1, a glass article 100 is schematically depicted according to one or more embodiments described herein. The glass article 100 generally comprises a shaped glass substrate 102 and a polymer overmold 104. The shaped glass substrate 102 generally comprises a first face 106, a second face 108 (depicted in FIG. 3) located opposite the first face 106, and a perimeter edge. In the embodiment shown in FIG. 1 the polymer overmold 104 is attached to at least a portion of the perimeter edge of the shaped glass substrate 102. For example, in the embodiment shown in FIG. 1, the polymer overmold 104 is attached to the entire perimeter edge of the shaped glass substrate 102 (i.e., the polymer overmold surrounds the entire perimeter edge of the shaped glass substrate as depicted in FIG. 1). However, in other embodiments (not shown) the polymer overmold 104 is only attached to a portion of the perimeter edge of the shaped glass substrate 102.

While FIG. 1 depicts a rectangular shaped glass substrate 102, it should be understood that the shaped glass substrate may be formed in other shapes. For example, and without limitation, the shaped glass substrate may be circular, square or any other regular or irregular shape. Further, while FIG. 1 depicts the shaped glass substrate 102 as being planar, it should be understood that the shaped glass substrate may be curved, such as when the shaped glass substrate has a curved cross-sectional profile in at least one dimension.

In the embodiments of the glass article 100 described herein, the shaped glass substrate 102 may generally have a thickness in the range from about 0.2 mm to about 2.0 mm. For example, in some embodiments the shaped glass substrate 102 has a thickness in the range of 0.3 mm to 1 mm. In other embodiments the shaped glass substrate 102 has a thickness in the range of 0.3 mm to 0.7 mm. In yet other embodiments the shaped glass substrate 102 has a thickness in the range of 0.3 mm to 0.5 mm. However, it should be understood that thicker shaped glass substrates (i.e., thicker than 2.0 mm) may also be used.

Where the glass article 100 is used in a display, (i.e., where an image will be viewed through the shaped glass substrate 102), the shaped glass substrate 102 comprises a transparent glass or glass-ceramic material. However, in other embodiments, the shaped glass substrate 102 may be a translucent or opaque glass or glass-ceramic material.

Figure 2:
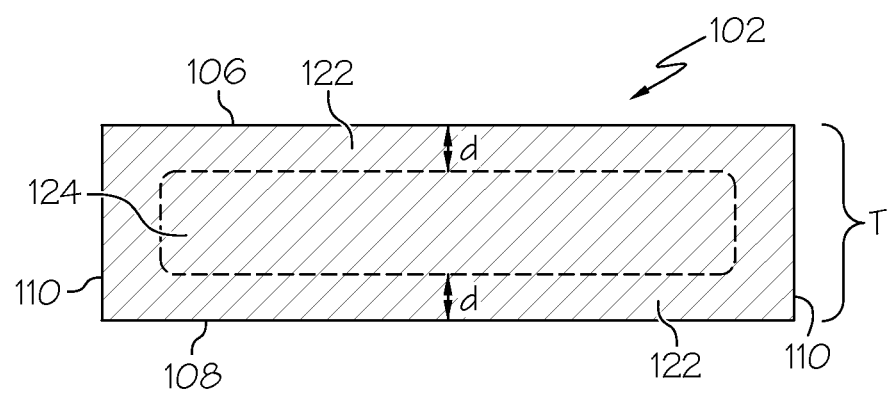
FIG. 2 schematically depicts a cross-section of a shaped glass substrate according to one or more embodiments shown and described herein.

Referring now to the cross section through the thickness of a shaped glass substrate 102 illustrated in FIG. 2, in one embodiment, the shaped glass substrate 102 comprises strengthened glass in which compressive stresses are introduced in the surface (i.e., the first face 106 and/or the second face 108) of the shaped glass substrate 102 to a selected depth d below the surface of the shaped glass substrate 102 to form a compressive stress layer 122. In the embodiment of the shaped glass substrate 102 depicted in FIG. 2 the compressive stress layer 122 is formed in the first face 106 of the shaped glass substrate 102. The compressive stress layer 122 improves the durability of the shaped glass substrate 102 by preventing the propagation of cracks in the first face 106 of the shaped glass substrate. The introduction of the compressive stress layer 122 in the shaped glass substrate 102 is accompanied by the development of a tensile stress layer 124 (not drawn to scale) such that the net stress in the shaped glass substrate 102 sums to zero. It should be understood that the compressive stress reported herein is the peak compressive stress at the first face 106. It should also be understood that the compressive stress decreases from the peak stress to a value of zero at depth d and is accompanied by the development of a tensile stress layer.

While the incorporation of a compressive stress layer 122 in the surface of the shaped glass substrate 102 improves the ability of the shaped glass substrate to withstand surface damage (i.e., scratches, shallow cracks, chips, etc.), if the surface damage extends through the compressive stress layer 122 and into the tensile stress layer 124, the tensile stresses in the tensile stress layer 124 cause the surface damage to propagate through the shaped glass substrate 102 causing the shaped glass substrate 102 to fracture. The edges 110 of the shaped glass substrate 102 are the most susceptible to damage due to handling or as a result of grinding and edge finishing of the glass. A polymer overmold is added to at least a portion of the perimeter edge of the shaped glass substrate to prevent such damage, as will be described in more detail herein.

The compressive stress layer 122 extends below the surface of the shaped glass substrate 102 to a depth d. In one embodiment, the shaped glass substrate 102 has a compressive stress layer 122 with a depth d of ≥15 microns. In another embodiment, the shaped glass substrate 102 has a compressive stress layer 122 with a depth d≥30 microns. In another embodiment, the shaped glass substrate 102 has a compressive stress layer with a depth d>50 microns. In a further embodiment, the shaped glass substrate 102 has a compressive stress layer with a depth d>100 microns. In another embodiment the shaped glass substrate 102 has a compressive layer with depth d of approximately 500 microns. In some embodiments, the depth d of the compressive layer is ≥30 microns and less than 250 microns while in other embodiments the depth d of the compressive layer is ≥30 microns and less than 100 microns.

In the embodiments where the shaped glass substrate 102 is formed from strengthened glass comprising a compressive stress layer 122, the peak compressive stress in the compressive stress layer 122 (i.e., the compressive stress at one of the faces 106, 108) is greater than 10 MPa. In another embodiment, the compressive stress in the compressive stress layer 122 is greater than about 50 MPa. In a further embodiment, the compressive stress in the compressive stress layer 122 is greater than about 200 MPa. In another embodiment, the compressive stress in the compressive stress layer 122 is greater than about 500 MPa.

Where the shaped glass substrate 102 is formed from strengthened glass, as described hereinabove, the strengthened glass may comprise thermally tempered glass; chemically tempered (i.e., ion-exchanged) glass; a laminated glass in which a glass core is symmetrically laminated with low coefficient of thermal expansion (CTE) skin glass; or various combinations thereof. For example, the shaped glass substrate 102 may be strengthened by combining lamination and thermal tempering; lamination and chemical tempering; or a combination of lamination, chemical tempering and thermal tempering.

Where the shaped glass substrate 102 is strengthened by thermal tempering, the compressive stress introduced by thermal tempering depends on the physical properties of the shaped glass substrate 102, such as the thickness T of the shaped glass substrate and the rate at which the glass is quenched during the tempering process. The compressive stress introduced through thermal tempering can range from about 5 MPa to 140 MPa. In one embodiment, the maximum depth of the compressive stress layer is generally 0.21T or 21% of the thickness T of the shaped glass substrate 102. For example, a shaped glass substrate with a thickness T=2 mm can have a compressive stress layer which extends from the surface of the shaped glass substrate to a depth d of about 420 microns.

Where the shaped glass substrate 102 is chemically strengthened (i.e., by ion exchange), the compressive stress introduced in the glass depends on the composition of the glass, the thickness of the glass and process parameters such as ion-exchange bath temperatures and ion-exchange times. For example, the amount of compressive stress introduced into the glass depends on whether $Na^+$ ions are being exchanged with $K^+$ or $Cs^+$ ions or whether $Li^+$ ions are being exchanged with $Na^+$, $K^+$ or $Cs^+$ ions. In general, the compressive stress introduced into a shaped glass substrate through ion exchange can range from about 10 MPa to about 800 MPa while the depth d of the compressive stress layer due to the ion-exchange process can range from about 15 microns to about 100 microns.

In embodiments where the shaped glass substrate 102 is strengthened by lamination, the compressive stress introduced by lamination depends on the difference in thermal expansion between the parent glass and the skin glass as well as their relative thicknesses. In general, the compressive stresses introduced by lamination range from about 10 MPa to about 200 MPa while the depth d of the compressive stress layer can range from about 20 microns to about 100 microns.

In some embodiments, the shaped glass substrate 102 may have a compressive stress layer with a greater compressive stress and a greater depth of compression than can be individually achieved by thermal tempering, chemical tempering or lamination alone. Such an embodiment can be achieved by combining the aforementioned processes sequentially. For example, in one embodiment, the shaped glass substrate 102 may be first chemically tempered followed by a thermal tempering treatment. In another embodiment, the shaped glass substrate 102 may be formed from laminated glass which is either chemically tempered or thermally tempered following lamination. In yet another embodiment, the shaped glass substrate may be formed from laminated glass which is chemically tempered followed by thermal tempering. In some embodiments the depth of the compressive stress layer 122 is ≥30 microns and less than 100 microns and the peak compressive stress in the compressive stress layer is greater than 200 MPa. In other embodiments the depth of the compressive stress layer 122 is ≥30 microns and less than 100 microns and the peak compressive stress in the compressive stress layer is greater than 400 MPa. In other embodiments the depth of the compressive stress layer 122 is ≥30 microns and less than 100 microns and the peak compressive stress in the compressive stress layer is greater than 400 MPa and less than 1000 MPa.

In one embodiment, the shaped glass substrate is formed from commercially available strengthened glass such as, for example, Gorilla™ Glass manufactured by Corning, Inc. However, while the glass article 100 has been described herein as comprising a shaped glass substrate formed from strengthened glass, it should be understood that, in other embodiments, the shaped glass substrate is formed from non-strengthened glass.

Figure 3A:
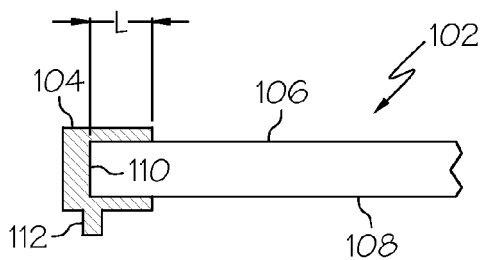
FIGS. 3A-3L schematically depict partial cross-sections of glass articles comprising shaped glass substrates and polymer overmolds according to one or more embodiments shown and described herein.
Figure 3B:
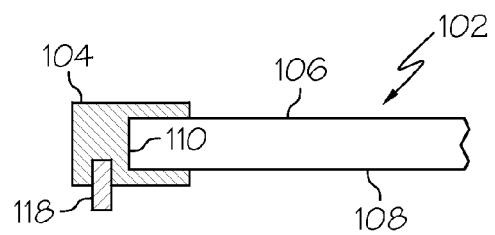
Figure 3C:
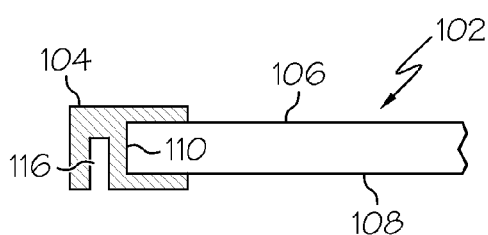
Figure 3D:
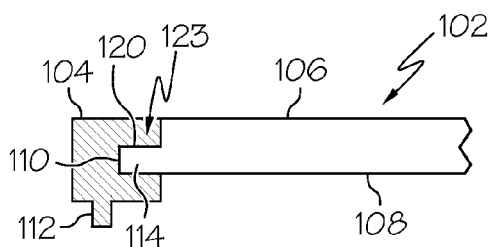

Referring now to the embodiment of the shaped glass substrate 102 depicted in FIGS. 2 and 3A-3C, the shaped glass substrate 102 may be formed such that the perimeter edge 110 of the shaped glass substrate 102 is substantially perpendicular with both the first face 106 and the second face 108 of the shaped glass substrate 102. Shaped glass substrates having square perimeter edges may be used when the polymer overmold 104 extends from the perimeter edge 110 over the first face 106 and the second face 108 and towards the center of the shaped glass substrate 102 such that at least a portion of the first face 106 and at least a portion of the second face 108 are covered by the polymer overmold 104 as depicted in FIGS. 3A-3C.

Figure 3E:
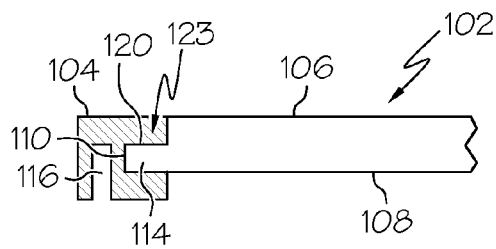
Figure 3F:
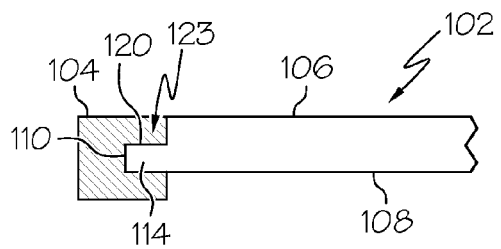
Figure 3G:
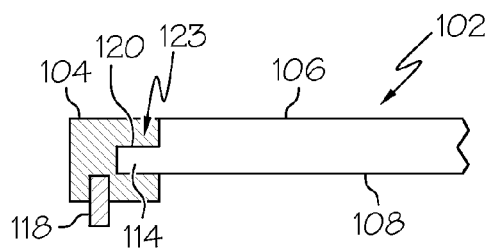
Figure 3H:
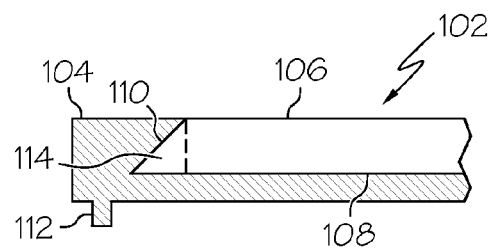
Figure 3I:
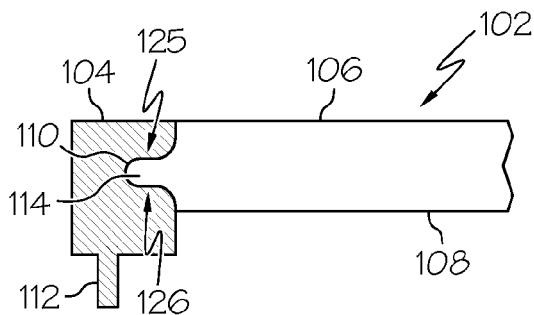
Figure 3J:
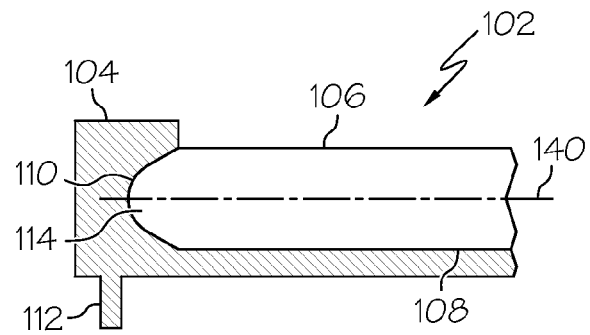

However, in other embodiments, the perimeter edge 110 of the shaped glass substrate 102 may be formed with an attachment feature 114 as depicted in FIGS. 3D-3L. The attachment feature 114 strengthens the interface between the shaped glass substrate 102 and the polymer overmold 104. The attachment feature 114 also permits the polymer overmold 104 to be formed on the shaped glass substrate 102 such that the polymer overmold 104 is flush with at least one of the first face 106 and/or the second face 108 of the shaped glass substrate 102, as depicted in FIGS. 3D-3I and 3L. Having the polymer overmold 104 flush with the first face 106 increases both the visible surface area on the first face 106 and the usable surface area on the first face 106 of the shaped glass substrate 102, such as when the shaped glass substrate 102 is used as a tactile interface (i.e., a touch screen). However, it should be understood that shaped glass substrates with attachment features may also be used with polymer overmolds which extend over all or part of at least one of the first face 106 or the second face 108, as depicted in FIGS. 3H and 3J.

Referring to the embodiments of the shaped glass substrate 102 depicted in FIGS. 3D-3G, the attachment feature 114 is a tongue formed in the perimeter edge 110 of the shaped glass substrate 102. In these embodiments, the attachment feature 114 (i.e., the tongue) is recessed from the first face 106 of the shaped glass substrate 102 thereby forming a seat 123 in the perimeter edge 110 of the shaped glass substrate 102.

FIG. 3H schematically depicts a partial cross section of another embodiment of a shaped glass substrate 102 with an attachment feature 114. In this embodiment, the attachment feature 114 comprises a 45 degree bevel formed in the perimeter edge 110 of the shaped glass substrate 102. In the embodiment depicted in FIG. 3H, the bevel is formed in the perimeter edge 110 of the shaped glass substrate 102 such that a width of the first face 106 is less than a width of the second face 108. However, it should be understood that, in other embodiments, the bevel may be formed in the shaped glass substrate 102 such that the width of the second face 108 is less than the width of the first face 106. Further, while FIG. 3H depicts a 45 degree bevel, it should be understood that other bevels may be used which are less than 45 degrees or more than 45 degrees. Further, in embodiments where the attachment feature 114 is an edge bevel as depicted in FIG. 3H, the edge bevel increases the interface area between the polymer overmold 104 and the shaped glass substrate 102 thereby improving the bond between the polymer overmold 104 and the shaped glass substrate 102.

FIG. 3I schematically depicts a partial cross section of another embodiment of a shaped glass substrate 102 with an attachment feature 114. In this embodiment, the attachment feature 114 comprises a tongue formed in the perimeter edge 110 of the shaped glass substrate 102. The attachment feature (i.e., the tongue) is recessed from both the first face 106 and the second face 108 thereby forming a first seat 125 adjacent the first face 106 and a second seat 126 adjacent the second face 108. In the embodiment of the attachment feature 114 depicted in FIG. 3I, the tongue is formed in the perimeter edge 110 of the shaped glass substrate 102 without sharp, angular transitions. More specifically, the attachment feature transitions into the shaped glass substrate 102 with a smooth radius of curvature to minimize or mitigate stress concentration points between the attachment feature 114 and the body of the shaped glass substrate 102.

Figure 3K:
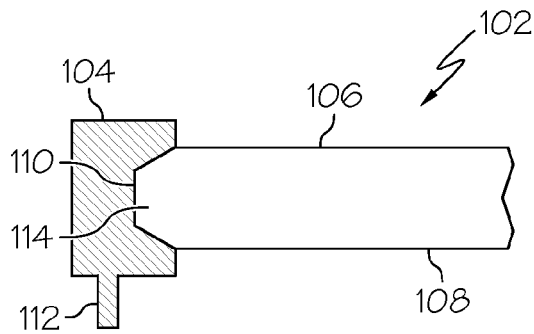

FIGS. 3J and 3K schematically depict alternative embodiments of shaped glass substrates in which the attachment feature 114 is a symmetrical edge bevel. For example, FIG. 3J schematically depicts an embodiment of a shaped glass substrate 102 where the perimeter edge 110 of the shaped glass substrate 102 is formed with a symmetrical edge bevel in which the radius of curvature of the bevel increases from the centerline 140 of the glass substrate to the faces 106, 108 of the shaped glass substrate 102. FIG. 3K schematically depicts another embodiment of a shaped glass substrate 102 where the perimeter edge 110 of the shaped glass substrate 102 is formed with a symmetrical edge bevel in which the shaped glass substrate 102 is inwardly tapered towards the centerline 140 from the faces 106, 108 to the perimeter edge 110. While FIGS. 3J and 3K show a polymer overmold 104 that is overlapping the faces 106, 108, it should be understood that the polymer overmold may be flush with at least one of the first surface 106 or the second face 108. Further, in FIGS. 3J and 3K the attachment feature 114 is symmetrical about the centerline of the shaped glass substrate and provides a mechanism by which the polymer overmold may be integrally mechanically coupled to the shaped glass substrate.

Figure 3L:
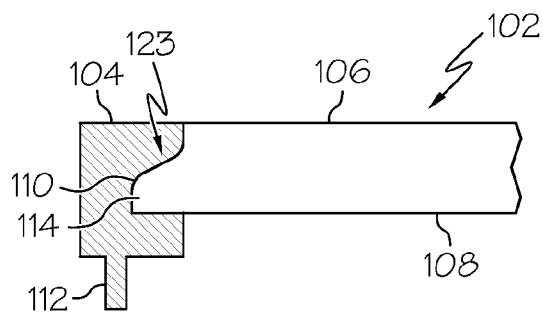

FIG. 3L depicts another alternative embodiment of a shaped glass substrate 102 with an attachment feature 114 formed in the perimeter edge 110 of the shaped glass substrate 102. In this embodiment, the attachment feature 114 is a beveled tongue. The attachment feature 114 is recessed from the first face 106 of the shaped glass substrate 102 thereby forming a seat 123 adjacent to the first face 106 of the shaped glass substrate 102. More specifically, the attachment feature 114 is formed adjacent to the perimeter edge 110 of the shaped glass substrate 102 similar to the attachment feature 114 depicted in FIG. 3D. However, in this embodiment, the attachment feature 114 is tapered in a direction extending away from the shaped glass substrate 102. Further, the attachment feature 114 transitions into the shaped glass substrate 102 with a smooth radius of curvature to minimize or mitigate stress concentration points between the attachment feature 114 and the body of the shaped glass substrate 102.

In one embodiment, the attachment features depicted in FIGS. 3D-3L are formed in the shaped glass substrate by machining (i.e., by grinding, milling, laser ablation, etc.). In an alternative embodiment, the attachment features may be formed in the perimeter edge of the shaped glass substrate by hot forming processes as the shaped glass substrate is formed from molten glass.

Referring again to FIG. 1, the polymer overmold 104 attached to the perimeter edge of the shaped glass substrate 102 generally comprises an injection moldable polymeric material. Suitable injection moldable polymeric materials from which the polymer overmold 104 may be formed include, without limitation: thermoplastics including polystyrene (PS), high impact PS, polycarbonate (PC), nylon (sometimes referred to as polyamide (PA)), poly(acrylonitrile-butadiene-styrene) (ABS), PC-ABS blends, polybutyleneterephthlate (PBT) and PBT co-polymers, polyethyleneterephthalate (PET) and PET co-polymers, polyolefins (PO) including polyethylenes (PE), polypropylenes (PP), cyclicpolyolefins (cyclic-PO), modified polyphenylene oxide (mPPO), polyvinylchloride (PVC), acrylic polymers including polymethyl methacrylate (PMMA), thermoplastic elastomers (TPE), polyetherimide (PEI) and blends of these polymers with each other. Suitable injection moldable thermosetting polymers include epoxy, acrylic, styrenic, phenolic, melamine and silicone resins. The polymers can contain impact modifiers, flame retardants, UV inhibitors, antistatic agents, mold release agents, fillers including glass, metal or carbon fibers or particles (including spheres), talc, clay or mica and colorants.

In one embodiment, the polymer overmold 104 extends entirely or partially over at least one of the first face 106 or the second face 108 of the shaped glass substrate. For example, FIGS. 3A-3C schematically depict embodiments where the polymer overmold 104 extends partially over both the first face 106 and the second face 108 from the perimeter edge of the shaped glass substrate 102 by a selected distance L (depicted in FIG. 3A) while FIGS. 3H and 3J schematically depict embodiments where the polymer overmold extends over the entire second face 108 of the shaped glass substrate 102. In embodiments where the polymer overmold extends partially over at least one or both of the faces 106, 108 of the shaped glass substrate 102 by a selected distance L, the selected distance L may be in a range from about 1.0 mm to about 10 mm. In other embodiments the selected distance L may be from about 2 mm to about 6 mm. The selected distance L is ultimately dependent on the end use of the glass article.

In alternative embodiments, such as when the shaped glass substrate 102 comprises an attachment feature as described hereinabove, the polymer overmold 104 may be formed such that the polymer overmold 104 is flush with at least one of the first face 106 or the second face 108 of the shaped glass substrate 102, as described hereinabove. For example, FIGS. 3D-3I and 3L depict embodiments of shaped glass substrates 102 with attachment features 114 in which the polymer overmold 104 is flush with the first face 106 of the shaped glass substrate 102. The term "flush," as used herein, means that the transition between a surface (either the first face 106 or the second face 108) of the shaped glass substrate 102 and the polymer overmold 104 is smooth and continuous without any significant topographical variations between the shaped glass substrate 102 and the polymer overmold 104.

Referring now to FIGS. 3A-3E and FIGS. 3G-3L, the polymer overmold 104 may be formed with at least one connector for coupling the glass article to a housing or similar structure. For example, in the embodiments depicted in FIGS. 3A, 3D and 3H-3L, the polymer overmold 104 is integrally formed with a mechanical connector 112 which may be mated with a corresponding connector in a housing, device, etc., such that the glass article is attached thereto. In the embodiment of the mechanical connector 112 depicted in FIGS. 3A-3E and FIGS. 3G-3L, the mechanical connector 112 is a square ridge extending from the polymer overmold 104. The mechanical connector may be received in a channel having a corresponding shape and is suitably sized such that the mechanical connector 112 forms an interference fit with the channel. Alternatively, the mechanical connector may be suitably sized such that the mechanical connector may be joined with a corresponding channel using adhesives, ultrasonic welding or similar joining techniques. In one embodiment (not shown), the mechanical connector 112 may comprise one or more barbed protrusions or extensions forming a flexible clip extending from the mechanical connector 112. The clip may be interfaced with a corresponding opening in a housing or device such that the glass article is releasably attached to the housing or device.

Referring now to FIGS. 3C and 3E, in an alternative embodiment, the connector formed in the polymer overmold 104 may be a channel 116 which is integrally formed in the polymer overmold 104. The channel 116 may be suitably sized to receive a mechanical connector (e.g., the mechanical connector 112 shown in FIGS. 3A-3E and FIGS. 3G-3L) on a housing, device or even another glass article such that the glass article is attached thereto. Accordingly, it should be understood that the channel 116 may be sized such that the channel 116 and mechanical connector form an interference fit with one another. Alternatively, the channel 116 may be suitably sized such that the channel may be joined with a corresponding mechanical connector using adhesives, ultrasonic welding or similar joining techniques. In one embodiment (not shown), the channel may comprise one or more openings for receiving a barbed protrusion or extension of one or more flexible clips extending from a mechanical connector. The opening may be interfaced with a corresponding clip in a housing or device such that the glass article is releasably coupled to the housing or device.

Referring to FIGS. 3B and 3G, in yet another embodiment, the connector is a preformed connector which is co-molded with the polymer overmold. For example, in the embodiments depicted in FIGS. 3B and 3G, the polymer overmold 104 is co-molded with a metallic connector 118 which extends from the polymer overmold. In one embodiment, the metallic connector 118 may be formed with one or more holes (not shown) which may be used to couple the metallic connector 118 and the attached glass article to a housing, device, etc., such that the glass article is attached thereto. In another embodiment, the metallic connector 118 may be suitably sized to form an interference fit with a corresponding connector, such as a channel or the like, disposed in a housing, device etc. In yet another embodiment (not shown), the metallic connector may be used to electrically couple an electrical energy source to a coating applied to one of the first surface or the second surface of the shaped glass substrate. For example, one or more electrical leads (not shown) may be electrically coupled to one or both faces of the shaped glass substrate and molded with the polymer overmold such that the metallic connector is electrically coupled to the electrical leads and, in turn, the face(s) of the shaped glass substrate.

While specific connector embodiments have been depicted in FIGS. 3A-E and 3G-3L, it should be understood that the polymer overmold 104 may be formed (i.e., molded or co-molded) with different types of connectors having various configurations. Further, it should be understood that the connector molded or co-molded with the polymer overmold may be either a mechanical connector or an electrical connector.

Figure 4:
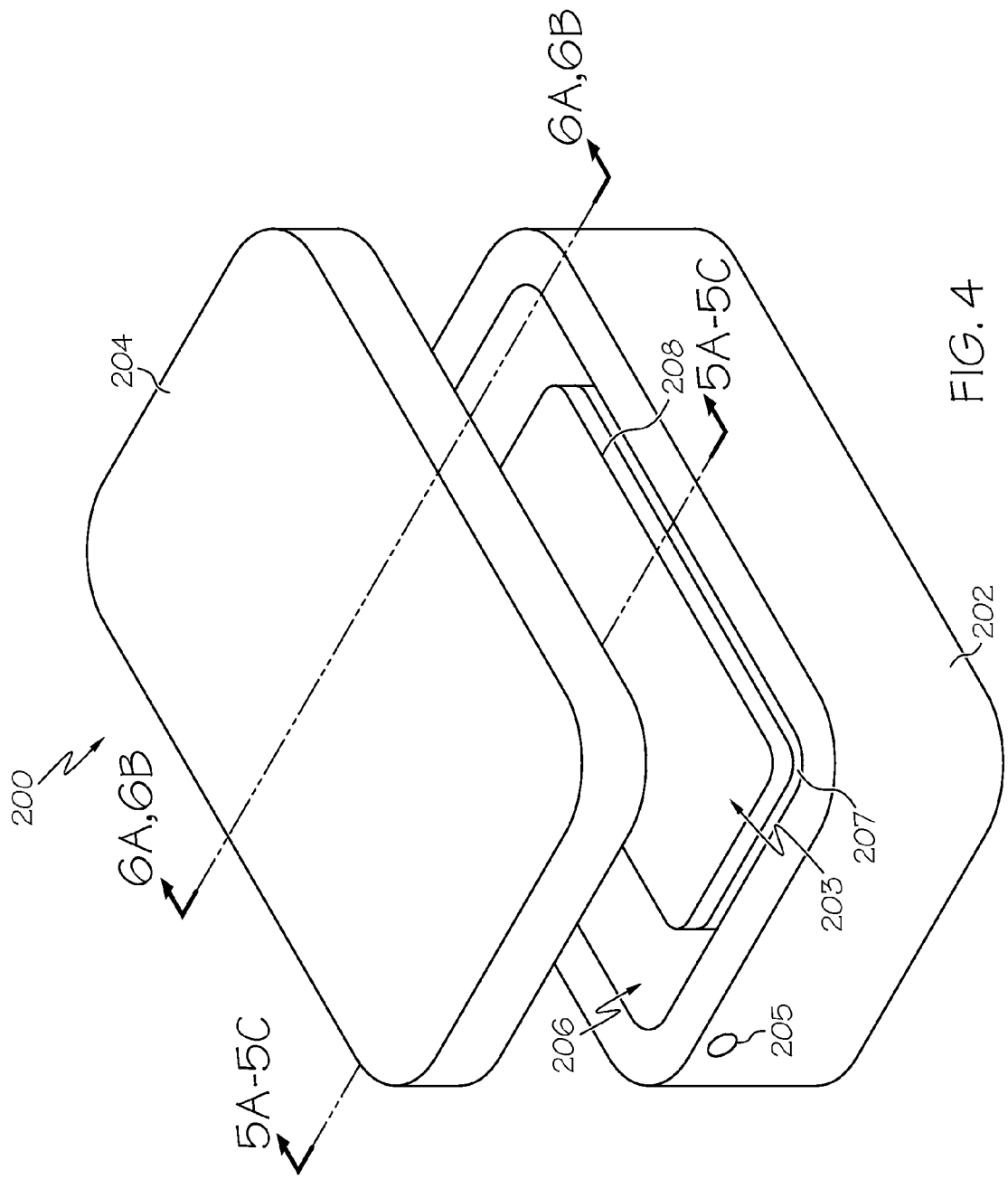
FIG. 4 schematically depicts a perspective view of an injection mold for forming the glass articles shown and described herein.

Referring now to FIG. 4, one embodiment of an injection mold 200 is schematically depicted. The injection mold 200 may be used to form a glass article comprising a shaped glass substrate 102 and a polymer overmold 104 as described hereinabove. The injection mold 200 generally comprises a first half 202 and a second half 204. The first half 202 of the injection mold 200 is formed with a mold cavity 203 which is fluidly coupled to a source of polymeric material (not shown) via the inlet port 205. The second half 204 of the injection mold 200 is shaped to engage with the first half 202 thereby sealing the mold cavity 203 as polymeric material is injected into the injection mold 200. In the embodiments described herein the injection mold 200 is formed from metallic materials including, without limitation, steel, aluminum or the like. In one embodiment (not shown), the injection mold may comprise a cooling systems for cooling heated polymeric material injection in the mold via the inlet port 205. In another embodiment (not shown), the first half of the injection mold and/or the second half of the injection mold may comprise one or more vacuum ports for securing a shaped glass substrate to the injection mold.

Figure 5A:
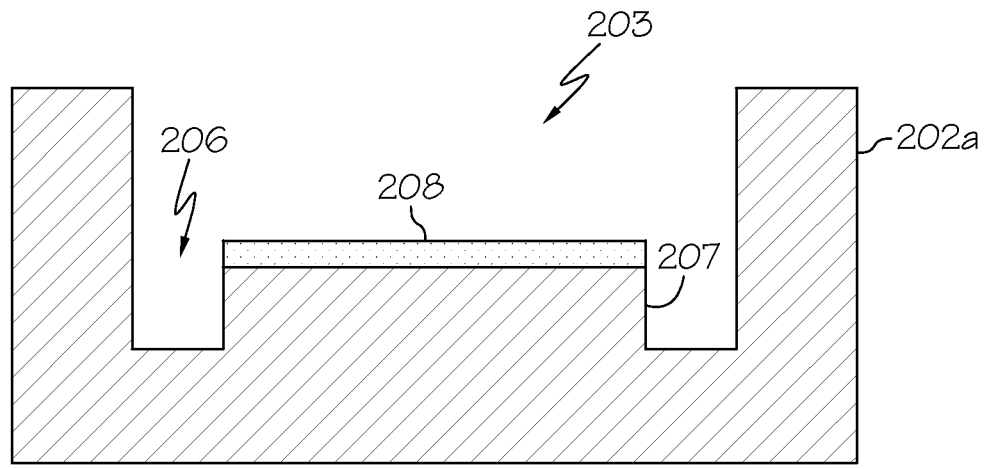
FIG. 5A schematically depicts a cross-section of a mold cavity of an injection mold for forming a glass article according to one or more embodiments shown and described herein.

Referring now to FIGS. 4 and 5A-5C, the mold cavity 203 is formed with a flow channel 206 extending around a central pedestal 207. A compliant layer 208 is positioned on the pedestal 207 to cushion the shaped glass substrate (not shown) during the injection molding process and protect the shaped glass substrate from damage. For example, in embodiments where the shaped glass substrate is formed from strengthened glass, surface irregularities (i.e., scratches, burs, surface roughness, etc.) in the surfaces of the mold within the mold cavity may project from the mold by an amount greater than the depth d of the compressive stress layer. If these surface irregularities are pressed through the compressive stress layer during the injection molding process, the shaped glass substrate will fail (i.e., shatter). Accordingly, the compliant layer 208 is utilized as an interface between the first half of the injection mold 200 and the shaped glass substrate to prevent damage to the shaped glass substrate during the injection molding process. For example, FIG. 5A depicts one embodiment of a first half 202a of an injection mold in which a compliant layer 208 is positioned on the pedestal 207 in the mold cavity. In one embodiment, the compliant layer 208 is formed from an elastically resilient material such as, for example, a rubber material or other, similar elastically deformable and recoverable material. In another embodiment, the compliant layer 208 is formed from an elastically resilient material which has a layer of adhesive opposite the shaped glass substrate. The layer of adhesive material facilitates securing the shaped glass substrate in the mold cavity 203 during the injection molding process. In some embodiments, the compliant layer 208 has an elastic modulus of less than 2000 MPa. In other embodiments the compliant layer 208 has an elastic modulus of less than 200 MPa. In still other embodiments the compliant layer 208 has an elastic modulus of less than 200 MPa and greater than 1 MPa. In another embodiment, the compliant layer 208 has a thickness which is less than 1 mm. In still other embodiments, the compliant layer 208 has a thickness of less than 1 mm and greater than 0.01 mm.

While the compliant layer 208 has been shown and described herein as being positioned within the mold cavity 203, it should be understood that, in other embodiments, the compliant layer 208 may be removably attached to the shaped glass substrate 102 such that the compliant layer 208 is positioned between the shaped glass substrate 102 and the pedestal 207 of the first half of the injection mold when the shaped glass substrate 102 is placed in the mold cavity 203. In still other embodiments, a compliant layer may be further positioned between the shaped glassed substrate and the second half 204b of the injection mold 200, as depicted in FIG. 6B.

Figure 5B:
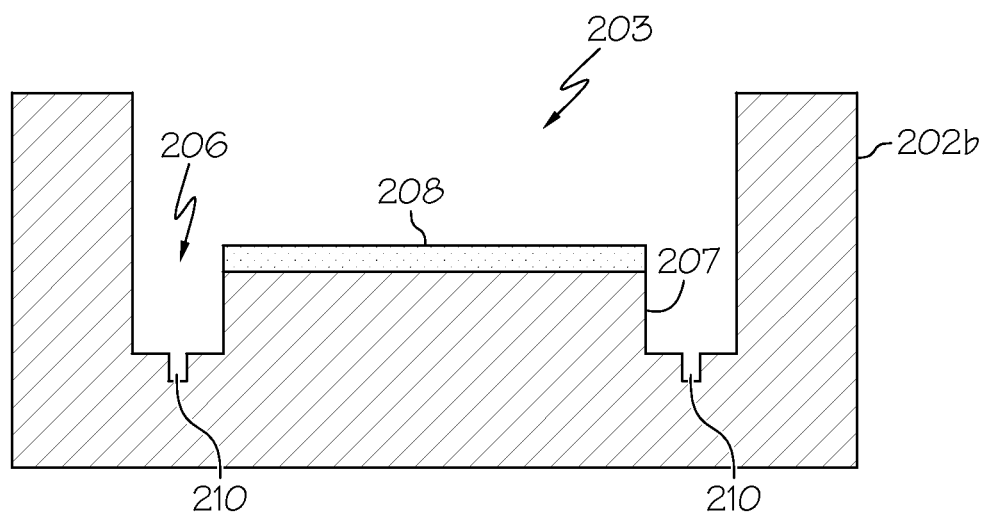
FIG. 5B schematically depicts a cross-section of a mold cavity of an injection mold for forming a glass article according to one or more embodiments shown and described herein.

Referring now to FIG. 5B, one embodiment of a first half 202b of an injection mold is schematically depicted in cross section. In the embodiment depicted in FIG. 5B, the flow channel 206 in the first half 202b of the injection mold is formed with a connector feature 210. The connector feature 210 is utilized to form a polymer overmold with a connector as shown in FIG. 3A, among others. In the embodiment schematically depicted in FIG. 5B, the connector feature 210 is a square channel formed in the flow channel 206. Alternatively, where the connector feature 210 is a channel as shown in FIG. 5B, a preformed connector piece (such as the metallic connector 118 depicted in FIGS. 3B and 3G) may be inserted into the connector feature 210 and the polymer overmold formed around the preformed connector piece such that the preformed connector piece is integrated into the polymer overmold, as depicted in FIGS. 3B and 3G.

Figure 5C:
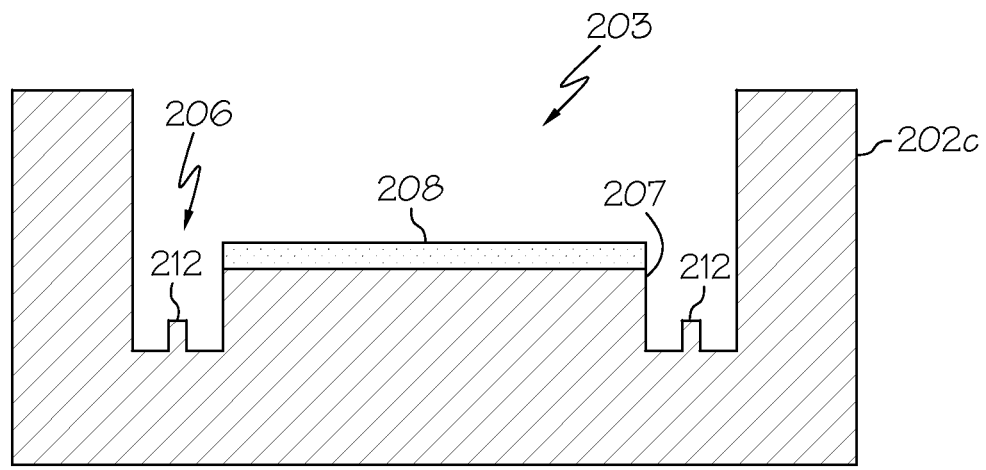
FIG. 5C schematically depicts a cross-section of a mold cavity of an injection mold for forming a glass article according to one or more embodiments shown and described herein.

While FIG. 5B depicts a connector feature 210 in the form of a channel, it should be understood that the connector feature may take on other shapes and/or forms. For example, FIG. 5C shows another embodiment of a connector feature 212 formed in the flow channel 206 in the mold cavity 203 of the first half 202c of an injection mold. In this embodiment the connector feature 212 is a ridge extending from the flow channel 206. The ridge may be utilized to form a channel or groove-type connector in the polymer overmold as depicted in FIGS. 3C and 3E.

Figure 6A:
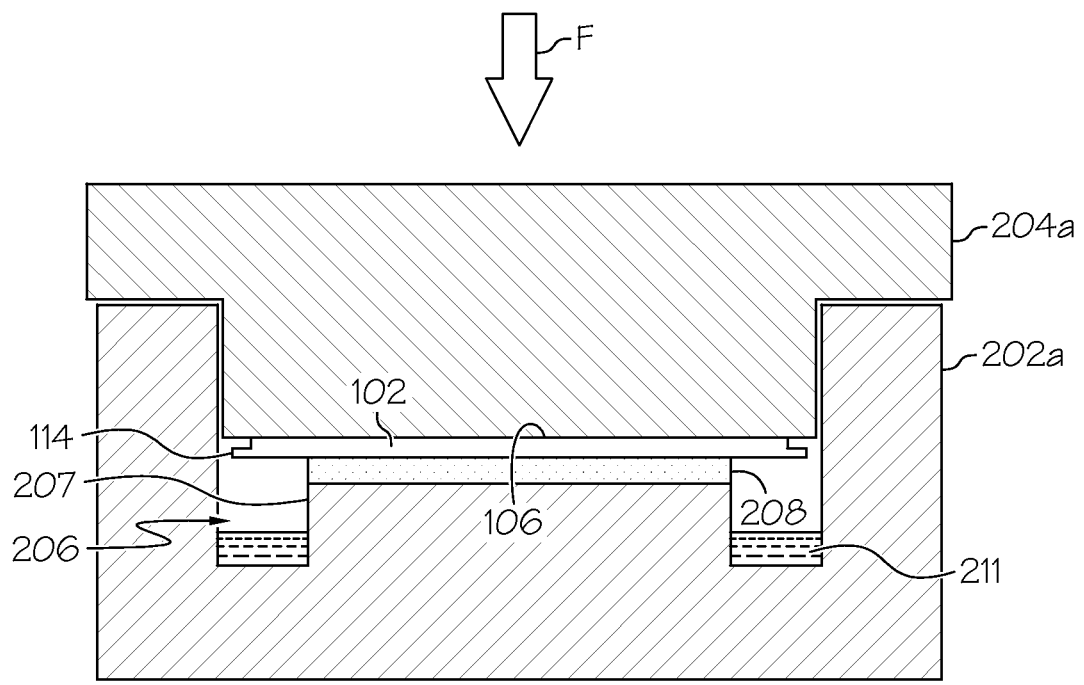
FIG. 6A schematically depicts a cross-section of a glass substrate positioned in an injection mold according to one or more embodiments shown and described herein.
Figure 6B:
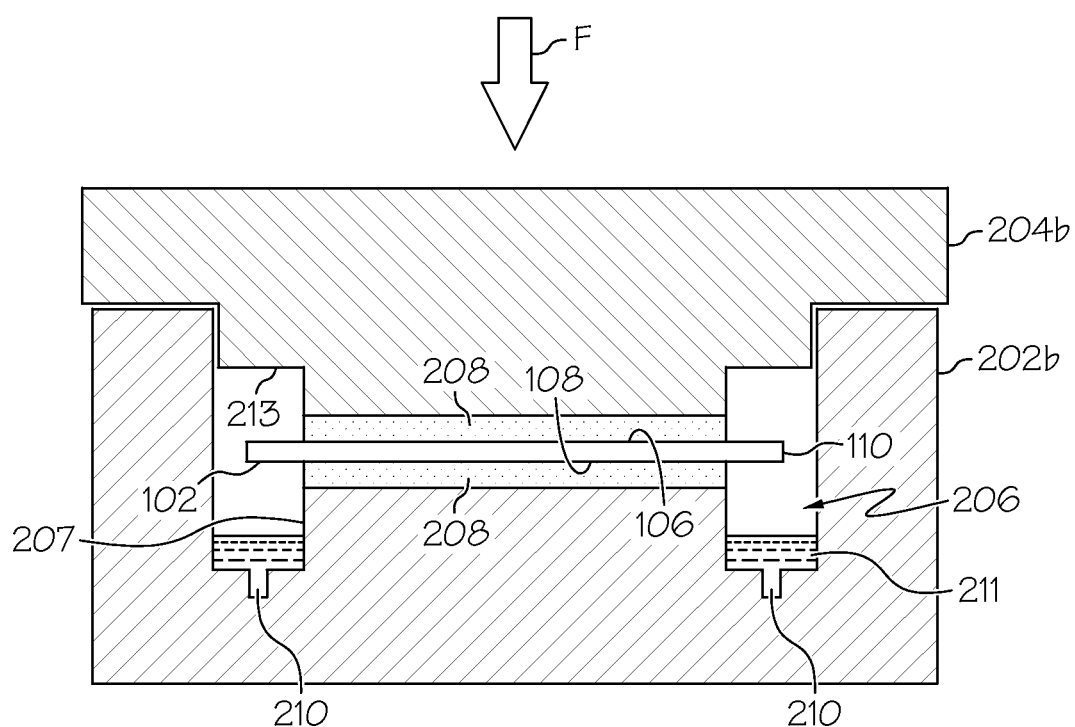
FIG. 6B schematically depicts a cross-section of a glass substrate positioned in an injection mold according to one or more embodiments shown and described herein.

Referring now to FIG. 6A, to form a glass article comprising a shaped glass substrate 102 with a polymer overmold, the shaped glass substrate 102 is first positioned in the mold cavity 203 of the first half 202a of the injection mold such that the shaped glass substrate 102 is positioned on the pedestal 207 and the compliant layer 208 is disposed between the shaped glass substrate 102 and the pedestal 207. In this embodiment, the perimeter edge of the shaped glass substrate 102 comprises an attachment feature 114 and the second half 204a of the injection mold is shaped such that the resulting polymer overmold (not shown) is flush with the first face 106 of the shaped glass substrate.

Thereafter, polymeric material 211 is injected in the mold cavity through the inlet port 205 (depicted in FIG. 4) filling the flow channel 206 and conforming around the exposed portions of the shaped glass substrate 102. A force F is applied to the second half 204a of the injection mold while the first half 202a of the injection mold is held in a fixed position. The force F applied to the second half 204a of the injection mold seats the second half 204a of the injection mold in the mold cavity and seals the second half 204a of the injection mold against the first half 202a thereby insuring that the polymeric material 211 flows around the shaped glass substrate 102 and encapsulates the exposed portions of the shaped glass substrate 102. The first half 202a and second half 204a of the injection mold depicted in FIG. 6A produce a glass article comprising a shaped glass substrate with a polymer overmold similar to that depicted in FIG. 3F.

Referring now to FIG. 6B, another embodiment of an injection molding process is schematically depicted. In this embodiment, the first half 202b and the second half 204b of the injection mold are shaped to produce a glass article comprising a shaped glass substrate with a polymer overmold similar to that depicted in FIG. 3A. In this embodiment, the shaped glass substrate 102 is first positioned in the mold cavity of the first half 202b of the injection mold such that the shaped glass substrate 102 is positioned on the pedestal 207 and the compliant layer 208 is disposed between the shaped glass substrate 102 and the pedestal 207. The perimeter edge of the shaped glass substrate 102 is substantially square, as described above. However, in this embodiment, the second half 204b of the injection mold is formed with a shoulder 213 which allows polymeric material to flow over a portion of the first face 106 of the shaped glass substrate 102. Further, in this embodiment, a compliant layer 208 is positioned between the second face 108 of the shaped glass substrate 102 and the pedestal 207 while an additional compliant layer 208 is positioned between first face 106 of the shaped glass substrate 102 and the second half 204b of the injection mold. Thereafter, polymeric material 211 is injected into the flow channel 206 as a force is applied to the injection mold such that the polymeric material fills the flow channel 206 as well as the connector feature 210.

While the glass articles comprising a shaped glass substrate and a polymer overmold have been described herein as being formed by an injection molding process, it should be understood that other polymer molding techniques may be used. For example, in one embodiment (not shown) the glass articles may be formed utilizing transfer molding techniques with UV curable polymer materials.

Figure 7A:
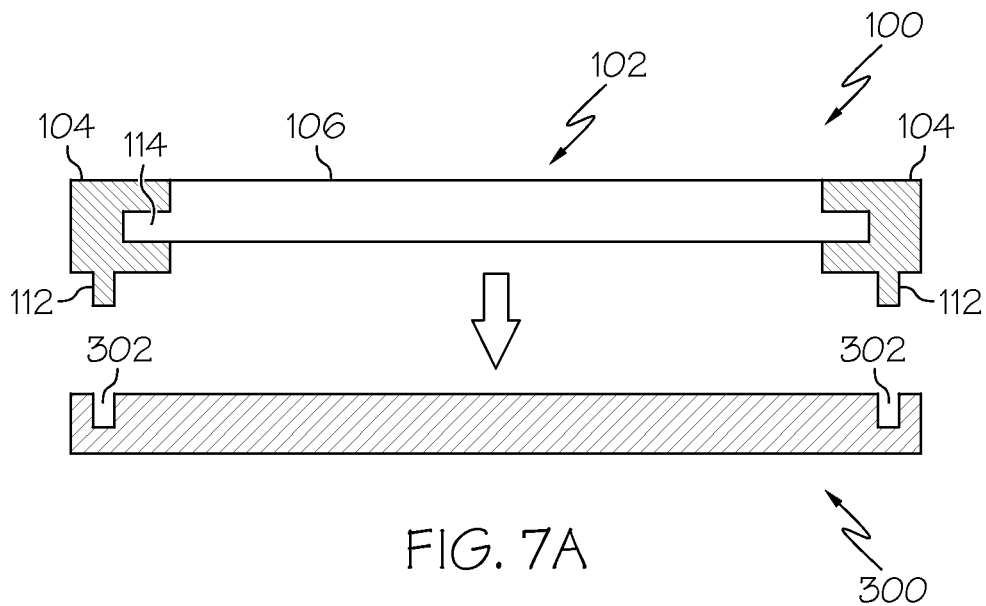
FIGS. 7A and 7B schematically depict construction of an assembly comprising a glass article according to one or more embodiments shown and described herein.
Figure 7B:
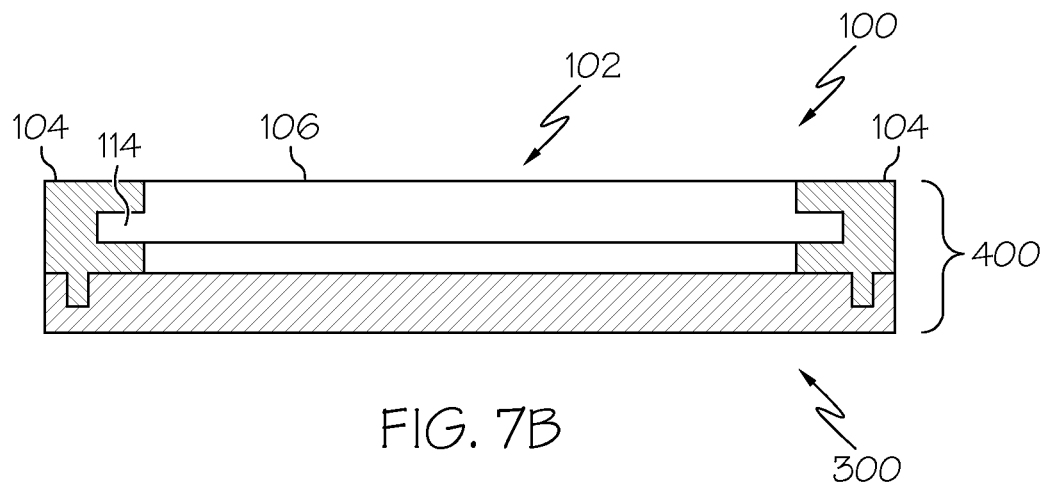

Referring now to FIGS. 7A and 7B, a glass article 100 comprising a shaped glass substrate 102 and a polymer overmold 104 is shown positioned for installation on to a housing 300 (FIG. 7A) and installed on the housing 300 (FIG. 7B) to form an assembly 400. The housing 300 may have one or more electronic devices (not shown) positioned thereon. In this embodiment, the shaped glass substrate 102 is formed with an attachment feature 114 such that the polymer overmold 104 is flush with the first face 106 of the shaped glass substrate 102. The polymer overmold 104 is integrally formed with a mechanical connector 112 for aligning and coupling the glass article 100 with the housing 300. More specifically, in the embodiment depicted in FIGS. 7A and 7B, the mechanical connector 112 of the polymer overmold 104 generally corresponds to and mates with a channel 302 formed in the housing 300.

To form the assembly 400, the glass article 100 is positioned relative to the housing 300 such that the mechanical connector 112 is aligned with the channel 302 in the housing 300, as depicted in FIG. 7A. In one embodiment, an adhesive or similar bonding material may be applied to the attachment feature, polymer overmold, channel, and/or the housing to further facilitate joining the glass article 100 to the housing 300. The glass article and housing are then pressed together such that the mechanical connector 112 of the polymer overmold 104 engages with the channel 302 in the housing 300, as depicted in FIG. 7B, to form assembly 400. In one embodiment, the mechanical connector 112 has an interference fit with the channel 302 in the housing 300, as shown in FIG. 7B. However, in other embodiments (not shown) the mechanical connector 112 may comprise a clip or similar connector which mechanically mates with a corresponding fastener or opening in the housing 300 thereby securing the glass article 100 to the housing 300. In other embodiments, the connection between the mechanical connector 112 of the polymer overmold 104 and the housing 300 may be strengthened by ultrasonic welding the mechanical connector to the housing. In still other embodiments, the polymer overmold may be formed with a channel (as depicted in FIGS. 3C and 3E) and the housing may be formed with a mechanical connector which corresponds to the channel. An assembly 400 as depicted in FIG. 7B may be incorporated into various electronic devices. By way of example and not limitation, such an assembly may be used as a cover in electronic devices such as mobile telephones, tablet computers, notebook computers, appliances, automotive headlamps, personal music players, electronic book readers, handheld calculators, computer mouse top covers, and the like. Other applications may include medical packaging and test equipment, biological assays and cell culture equipment.

While FIG. 7B depicts a glass article 100 attached to a housing 300, it should be understood that, in other embodiments, the glass article 100 may be attached to a second glass article thereby forming an assembly comprising two glass articles between which one or more electronic devices may be disposed.

It should now be understood that the method described herein may be utilized to produce a glass article comprising a shaped glass substrate with a polymer overmold attached to at least a portion of the perimeter of the shaped glass substrate. The polymer overmold protects the edge of the shaped glass substrate and improves the durability of the shaped glass substrate without the need for special edge finishing during the manufacture of the shaped glass substrate. Finishing the edges of glass substrates is a time consuming and moderately expensive process in which edge defects (for example, microcracks) that may result in the failure of the shaped glass substrate during use are removed. By utilizing a polymer overmold on the shaped glass substrate as described herein, edge finishing can be simplified (e.g., by just rough grinding with 100-600 grit) or eliminated thereby reducing production costs. Further, use of a polymer overmold coupled to the edges of a shaped glass substrate in a glass article cushions and protects the edges of the shaped glass substrate from accidental damage resulting from, for example, the glass article being dropped on a hard surface.

The glass articles described herein combine the advantageous properties of both glass and plastic into a single article. Specifically, the capability of forming polymers into complex shapes with precise dimensional control is combined with the high strength, impact resistance, durability and high temperature characteristics of glass in a single article which may be employed in a variety of applications. For example, the high temperature characteristics of glass permit the glass article to be readily incorporated in, for example, halogen type automotive headlamps where the operational temperatures of the headlamps are high. Additional benefits of the incorporation of glass into the article include transparency, dimensional stability, chemical inertness, thermal stability, resistance to air and gas permeation, resistance to UV degradation and scratch resistance. In some embodiments, shaped glass substrates which are not transparent to certain wavelengths of light may be incorporated. In other embodiments, the use of shaped glass substrates facilitates the incorporation of a fine surface structure to the surface of the glass to create an antiglare and/or low friction surface which is suitable for use in, for example, touch screens and display screens.

Further, embodiments described herein facilitate the use of lightweight, thin, sheet-formed glass substrates having high impact resistance in conjunction with polymer materials which can be precision molded thereby a glass article which has the lightweight features of polymers but adds the impact resistance, strength and durability of glass.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass article for use as a cover in electronic devices, the glass article comprising:
   a shaped glass substrate comprising a first face, a second face and a perimeter edge, wherein the perimeter edge is without sharp transitions from the first face to the second face; and
   a polymer overmold coupled to the perimeter edge of the shaped glass substrate,
   wherein the glass substrate is chemically strengthened glass having a thickness between about 0.2 mm to about 2.0 mm, a compressive stress from about 10 MPa to about 500 MPa which extends from each of the faces to a depth d thereby forming compressive stress layers from about 10 microns to about 100 microns in depth,
   wherein the glass has a tensile stress layer, and
   wherein the stress of the compressive stress layers and tensile stress layer sum to zero at or below depth d.

2. The glass article of claim 1 wherein the polymer overmold is flush with the first face of the shaped glass substrate.

3. The glass article of claim 1 wherein the polymer overmold is integrally formed with at least one connector.

4. The glass article of claim 1 wherein the perimeter edge further comprises a feature is selected from the group consisting of a bevel, a tongue, a symmetrical edge bevel, and a beveled tongue.

5. The glass article of claim 1 wherein the polymer overmold extends inward from the perimeter edge of the shaped glass substrate and over at least one of the first face or the second face of the shaped glass substrate by a selected distance.

6. An article for use as a cover in an electronic device, the article comprising:
   a shaped glass substrate comprising a first face, a second face and a perimeter edge, wherein the perimeter edge is without sharp transitions from the first face to the second face; and
   a polymer overmold coupled to the perimeter edge of the shaped glass substrate and having one or more mechanical connectors extending therefrom, the one or more mechanical connectors configured to mate with a corresponding opening in the electronic device,
   wherein the glass substrate is chemically strengthened glass having a thickness between about 0.2 mm to about 2.0 mm, a compressive stress from about 10 MPa to about 500 MPa which extends from each of the faces to a depth d thereby forming compressive stress layers from about 10 microns to about 100 microns in depth, and
   wherein the glass has a tensile stress layer,
   wherein the stress of the compressive stress layers and tensile stress layer sum to zero at or below depth d.

7. The glass article of claim 6 wherein the polymer overmold is flush with the first face of the shaped glass substrate.

8. The glass article of claim 6 wherein the polymer overmold is integrally formed with the one or more mechanical connectors.

9. The glass article of claim 6 wherein the perimeter edge further comprises a feature selected from the group consisting of a bevel, a tongue, a symmetrical edge bevel, and a beveled tongue.

10. The glass article of claim 6 wherein the polymer overmold extends inward from the perimeter edge of the shaped glass substrate and over at least one of the first face or the second face of the shaped glass substrate by a selected distance.

* * * * *